US005296071A

United States Patent [19]

Tapp

[11] Patent Number: 5,296,071

[45] Date of Patent: Mar. 22, 1994

[54] METHOD OF PRINTING AND CUTTING HEAVY STOCK ON FLEXOGRAPHIC PRESS

[75] Inventor: Dean Tapp, Mahtomedi, Minn.

[73] Assignee: Label Technologies, Inc., St. Paul, Minn.

[21] Appl. No.: 885,471

[22] Filed: May 19, 1992

[51] Int. Cl.[5] .............................................. B32B 31/00

[52] U.S. Cl. .................................... 156/267; 156/268; 156/257; 156/277; 83/33; 83/39; 83/865

[58] Field of Search ............... 156/267, 268, 257, 277, 156/578; 83/33, 39, 865

[56] References Cited

U.S. PATENT DOCUMENTS

| | | | |
|---|---|---|---|
| 4,153,496 | 5/1979 | Swift | 156/267 |
| 4,246,058 | 1/1981 | Reed | 156/267 |
| 4,273,606 | 6/1981 | Trilli | 156/267 |
| 4,285,754 | 8/1981 | DiMatteo | 156/267 |
| 4,364,787 | 12/1982 | Radzins | 156/578 |
| 4,427,759 | 1/1984 | Graetzmacher et al. | 156/234 |
| 4,491,495 | 1/1985 | Muscoplat | 256/253 |
| 4,528,055 | 7/1985 | Hattemer | 156/267 |
| 4,661,189 | 4/1987 | Voy et al. | 156/267 |
| 4,850,947 | 7/1989 | Brown et al. | 156/267 |
| 5,108,531 | 4/1992 | Quadracci | 156/277 |

*Primary Examiner*—Patrick J. Ryan
*Assistant Examiner*—Merrick Dixon
*Attorney, Agent, or Firm*—Jacobson & Johnson

[57] ABSTRACT

A method of making a foldable dial card having openings and edges in registration using a flexographic press. The process includes the steps of feeding an elongated stiff web into the flexographic press and then printing an image on the web, which is followed by feeding the printed web between an interior cutting roller and a backing roller to cut the internal regions of the dial card in the web material. After cutting the internal regions around the interior of the dial card the dial card is then fed under an air nozzle which removes the severed interior portions of the dial card from the web. Next, the printed web with the cut internal regions is fed between a second pair of rollers, one an exterior die cutting roller and the other a back up roller with the back-up roller moving at a faster surface velocity than the surface velocity of the exterior die cutting roller. The exterior die cutting roller cuts the external regions around the dial card so that the dial card can be removed from the web. Next the web is fed into a separator roller that separates the dial cards from the web material.

11 Claims, 5 Drawing Sheets t
33
33 t
33 t3
33

60
73
61f
61b
65f
65b
64f
64b
62
74
14
13
12
50d
52d
62d
33a
51d
33c
33
V1
32c
32
V2
34a

METHOD OF PRINTING AND CUTTING HEAVY STOCK ON FLEXOGRAPHIC PRESS

FIELD OF THE INVENTION

This invention relates generally to flexographic printing and more specifically, to flexographic printing and cutting of items such as foldable dial cards.

BACKGROUND OF THE INVENTION

The concept of flexographic printing is well known in the art. In general, flexographic printing is a relief printing process used for printing of labels, food wrappers, and the like. In the process, a web of material is passed through various stations that print ink onto the web, generally two to four colors which are dried between the printing stages. After printing, the web is fed between die cutting rollers that cut the label or article from the continuously moving web. The flexographic printing method works well for light paper stock however heavier paper stock in the range of 15 to 20 mil thickness, which is used for items such as dial cards cannot be satisfactorily processed. Typically, dial cards comprise a stiff backing sheet with the product such as a battery or the like held on the dial card by a clear plastic cover that is secured to the dial card.

The present invention comprises a method of using a flexographic press to print and cut heavier web stock for use in such items as dial cards. Typically, dial cards present a difficult challenge since multiple actions need to be accurately performed. That is, the dial card needs to be printed, cut from a stock material and then folded with the edges of the dial card located in register with each other. The use of existing flexographic equipment to print dial cards on heavier web stock has proved ineffective because of the thickness of the web stock needed for the dial cards. Typical problems encountered include creases formed in the article as well as the inability to accurately make the cuts, perforations and fold lines in the dial card. An additional problem is the flexographic press can jam when the heavier weight materials needed for dial cards is fed through the flexographic press; in addition, the cutting and registration using multiple dies usually results in a mismatched dial card when the two halves of the dial card are folded onto each other. The present invention provides an improved process to permit the printing and cutting of heavier stock items such as dial cards on a flexographic press.

SUMMARY OF THE INVENTION

Briefly, the invention comprises a method of making a foldable dial card having openings and edges in registration using a flexographic press. The process comprises the steps of feeding an elongated web into the flexographic press and then printing an image on the web, which is followed by feeding the printed web between an interior cutting roller and a backing roller to cut the internal regions of the dial card in the web material. After cutting the internal regions around the interior of the dial card, the dial card is then fed under an air nozzle which removes the severed interior portions of the dial card from the web. Next, the printed web with the cut internal regions is fed between a second pair of rollers, one an exterior die cutting roller and the other a back up roller with the back-up roller moving at a faster surface velocity than the surface velocity of the exterior die cutting roller. The exterior die cutting roller cuts the external regions around the dial card so that the dial card can be removed from the web. Next the web is fed into a separator roller that separates the dial cards from the web material.

DESCRIPTION OF THE PREFERRED EMBODIMENT

Figure 1:
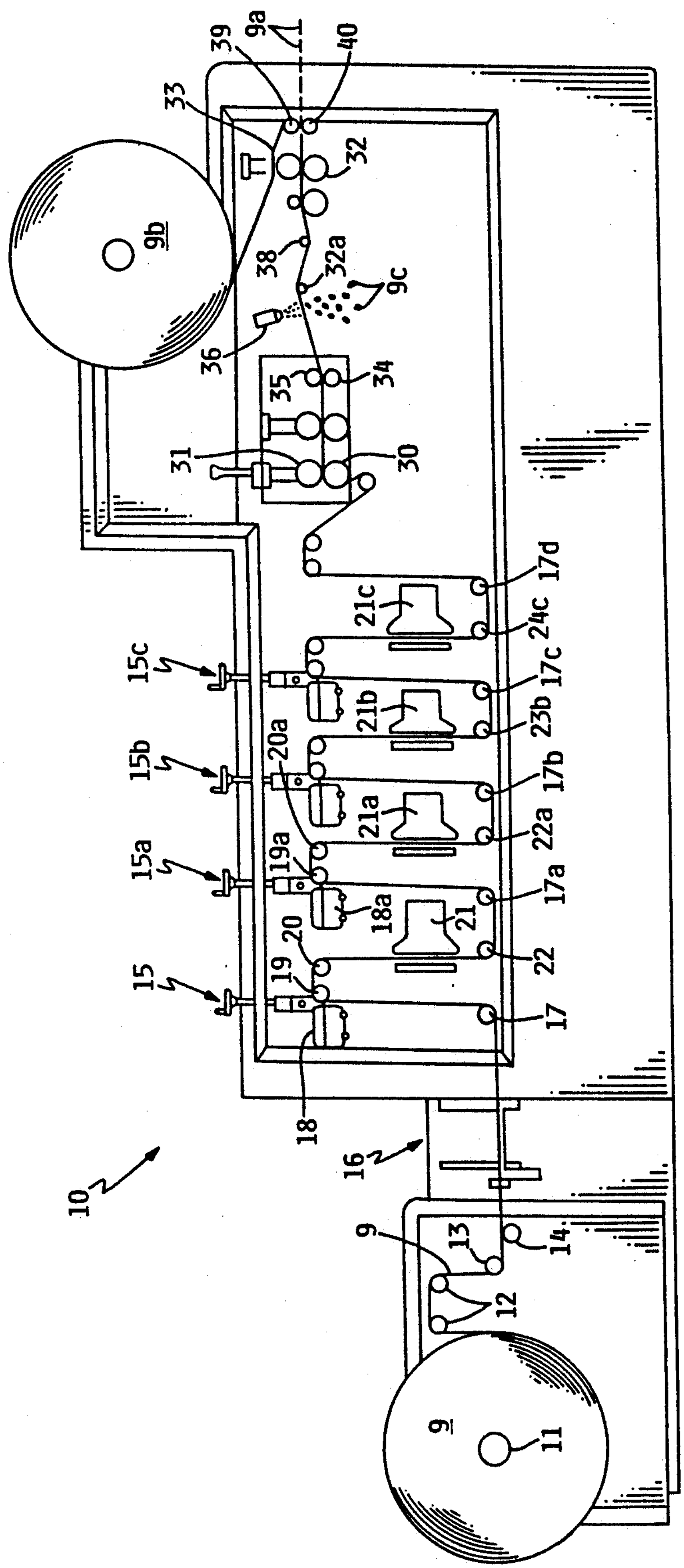
FIG. 1 is a front view of a flexographic printing press for printing and cutting a dial card.

Referring to FIG. 1, reference numeral 10, identifies the flexographic printing press of the present invention. Located on the left portion of the drawing is a web of paper stock 9 which sits on a spindle 11. Paper web 9, which is to be used to make a dial card, generally has a thickness of 19 to 20 mils. Web 9 passes around rollers 12, under roller 13, over roller 14 and through a web cleaning station 16. The web then passes into a first printing station 15 for applying a first color to the web. Printing station 15 comprises a first roller 17, a second roller 19, and a printing roller located in ink compartment 18 for printing the first color on the surface of web 9. The printed web 9 then passes over roller 20 and through an ink drying station 21 which dries the first ink on the web. After passing through the first printing station web 9 then passes under roller 22 and enters the second printing station 15*a* which applies a second color to the web.

If needed, additional colors can be applied to the web through similar printing station 15*b* and 15*c*. Since the operation of each printing station 15*a*, 15*b*, and 15*c* is identical to printing station 15 they will not be described herein.

After web 9 passes through the printing stations, it then passes through an interior cutting roller, an air ejection station, an exterior cutting roller, and a separating station that removes the waste material from around the dial cards.

FIG. 1 shows web 9 entering first die cutting station containing interior cutting roller 31 and backup roller 32*a*. After cutting interior regions on the dial card web 9 passes under an air injection port 36 which blows cutouts 9*c* from web 9. The web 9 then passes over rollers 32*a*, 38. Web 9 then is fed through a second die cutting station having an exterior cutting roller 33 and a backup roller 32. After leaving rollers 32 and 33 web 9 is fed between separating rollers 39 and 40. The outer periphery of the web 9*b* is then separated and wound onto a roll 9*b* while the individual dial cards 9*d* are fed directly onto a conveyor for further processing.

In order to understand the operation of the system and the various cuts needed to be completed to make a foldable dial card on a flexographic printing press, reference should be made to FIGS. 2-5 which shows a typical dial card with multiple types of cuts that have been completed on the flexographic printing press 10. Backing card 60 includes a front section 60*f* and a rear section 60*b* that is foldable behind front section 60*f* so that the edges and openings of the front section 60*f* and the back section 60*b* are in register with each other. In order to indicate the portions of dial card 60 that are in registration, the numerals for the front portion of the dial card are followed by "f" and the numerals for the back portion of the dial card are followed by "b".

The front portion of dial card 60 includes a first cutout opening 61*f*, a second cutout opening 64*f* and a third cutout opening 65*f*. A first perforation line 66*f* extends across front section 60*f*. A second perforation line 77*f* extends partially across front section 60*f*. A tab 75*f* has a first cut line 76*f* on one side and a second cut line 76*f* on the opposite side. The corner of dial card 60*f* includes a rounded upper corner designated by 70*f* and a rounded lower corner designated by 71*f*.

Similarly the rear portion of dial card 60 includes a first cutout opening 61*b*, a second cutout opening 64*b* and a third cutout opening 65*b*. A first perforation line 66*b* extends across back section 60*b*. A second perforation line 77*b* extends partially across back section 60*b*. A tab 75*b* has a first cut line 76*b* on one side and a second cut line 76*b* on the opposite side. The corner of dial card 60*b* includes a rounded upper corner designated by 70*b* and a rounded lower corner designated by 71*b*.

The corners between the two backing sections are identified by separate references numerals 73 and 74 and a fold line 62 formed by a partial cut which extends between the front section 60*f* and rear section 60*b*.

Figure 3:
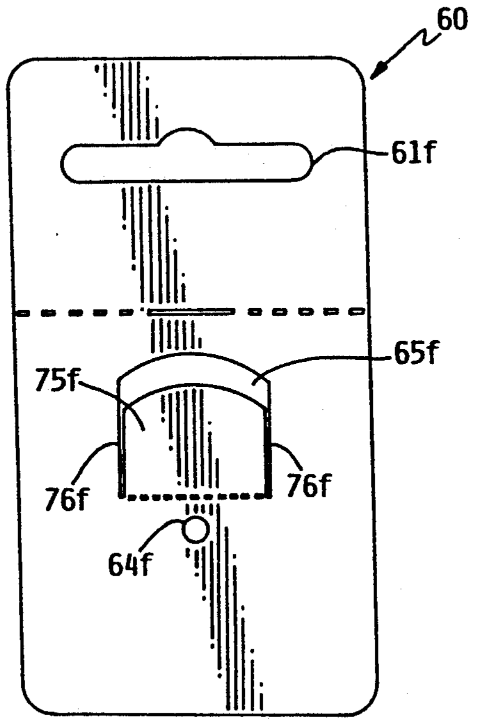
FIG. 3 shows a front view of the dial card in a folded condition.
Figure 4:
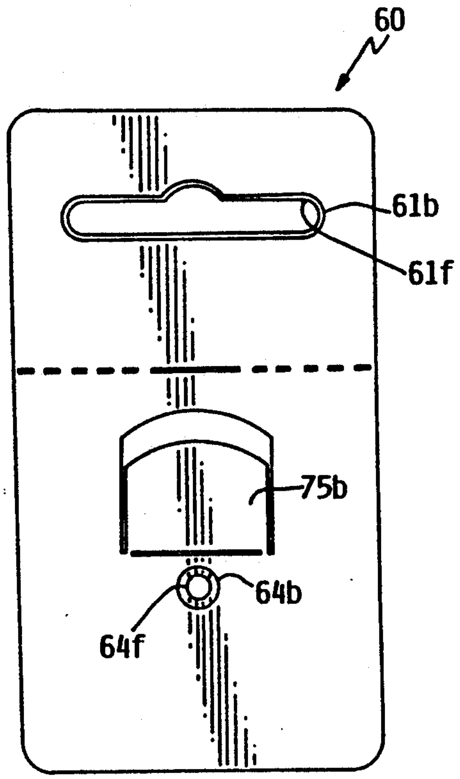
FIG. 4 shows a back view of the dial card in the folded condition.

FIG. 3 shows a front view of card 60 illustrating the back section 60*b* of the dial card 60 folded behind the front card 60*f* in registration so that the rear portion 60*b* is not visible in a frontal view. FIG. 4 shows the back view. In the embodiment shown the opening 61*b* is slightly larger than opening 61*f*. Similarly the opening 64*b* is slightly larger than opening 64*f*. The purpose of having the opening in the back section larger than the opening in the front section is to prevent the edges around the back opening from being visible when one views the dial card from a frontal view.

Figure 5:
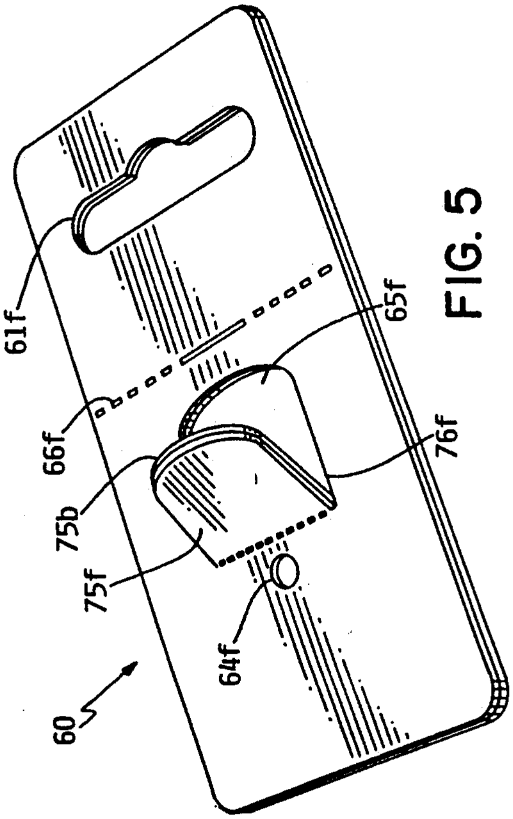
FIG. 5 shows a perspective view of the dial card with a pull-out tab.

FIG. 5 illustrates dial card 60 in perspective view illustrating how tabs 75*f* and 75*b* can be bent outward to provide access to a chamber located on the opposite side of the dial card.

Figure 6:
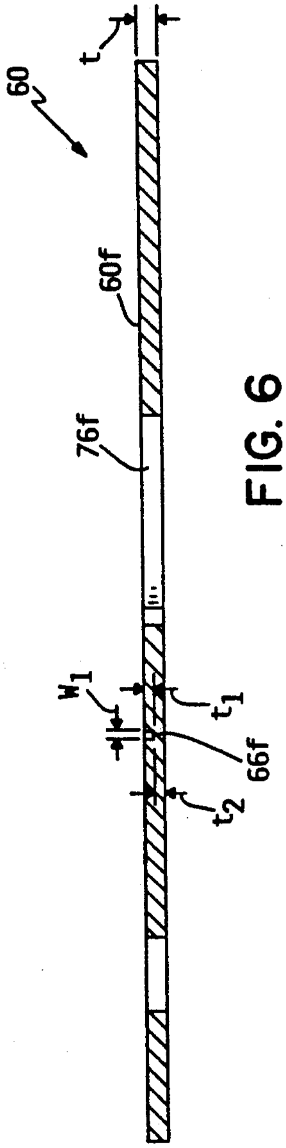
FIG. 6 shows a cross-sectional view taken along line 6—6 of FIG. 2.
Figure 7:
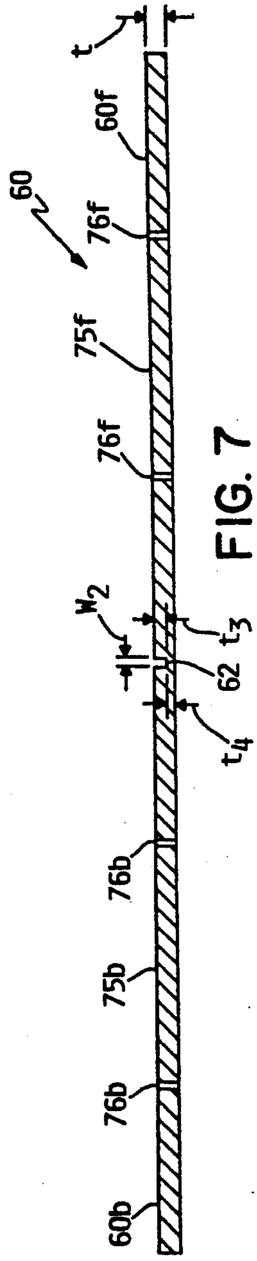
FIG. 7 shows a cross-sectional view taken along lines 7—7 of FIG. 2.
Figure 9:
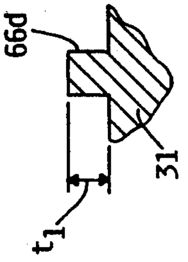
FIG. 9 is a cross sectional view taken along line 9—9 to show a perforation tooth.

In order to illustrate the precision cutting of the web to produce a foldable dial card, reference should be made to FIG. 6 and FIG. 7. FIG. 6 shows the dial card 60 of thickness t cut along line 6—6 of FIG. 2. Note the perforation line 66*f* has a depth of cut designated by $t_1$ and a depth of uncut designated by $t_2$. The perforation line 66*f* is formed by a rectangular die tooth 66*d* (see FIG. 9) to a depth approximately one half the thickness t of the material.

Figure 2:
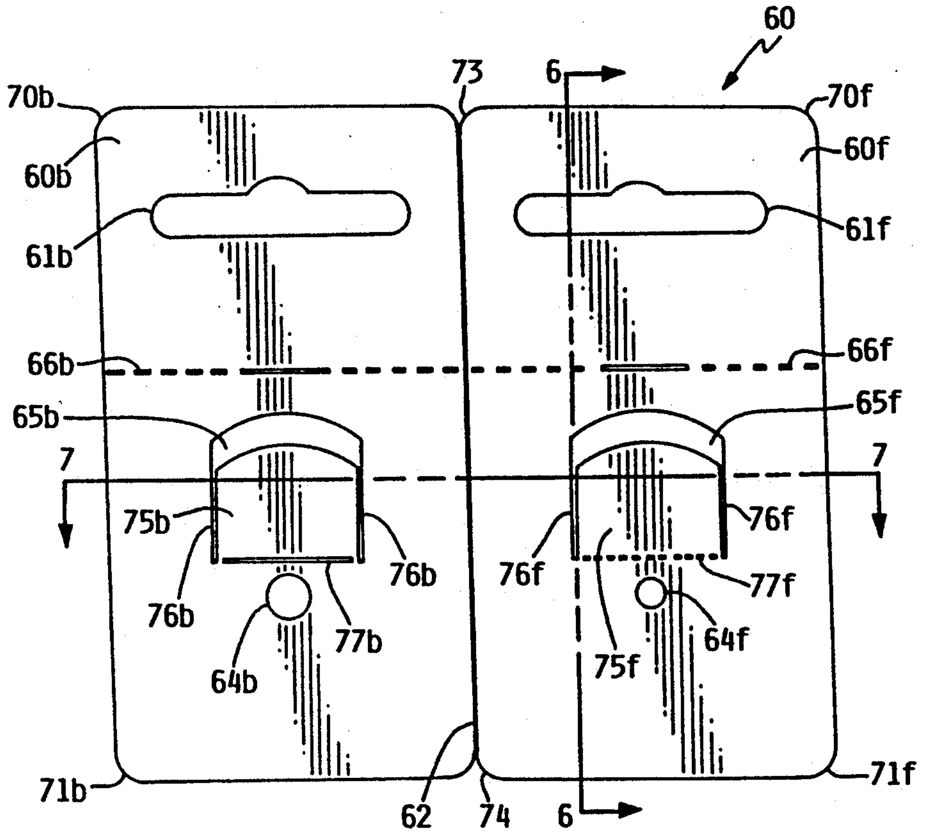
FIG. 2 shows a front plane view of a foldable dial card.

Referring to FIG. 7, the view is shown taken along lines 7—7 of FIG. 2 and illustrates the cut regions 76*b* and 76*f* extend completely through dial card 60. In contrast fold line 62 between the front portion 60*f* and the rear portion 60*b* is cut to a width $W_2$ and has a depth of cut designated by $t_3$ which is approximately $\frac{3}{4}$ of the thickness t with the remaining section approximately $\frac{1}{4}$ t. The purpose of having a partial cut 62 between the two sections with a depth of approximately $\frac{3}{4}$ of the thickness of the dial card is to form a hinge to allow front sections 60*f* and rear sections 60*b* to be folded onto each other in registration. By making the uncut region $t_3$ approximately $\frac{1}{4}$ t I provide a weakened region so that the front section folds on the rear section along the fold line 62 but not outside the fold line 62. The size of the cut lines are exaggerated but are shown to illustrate the relative positioning of the cut lines in regard to the dial card.

Figure 8:
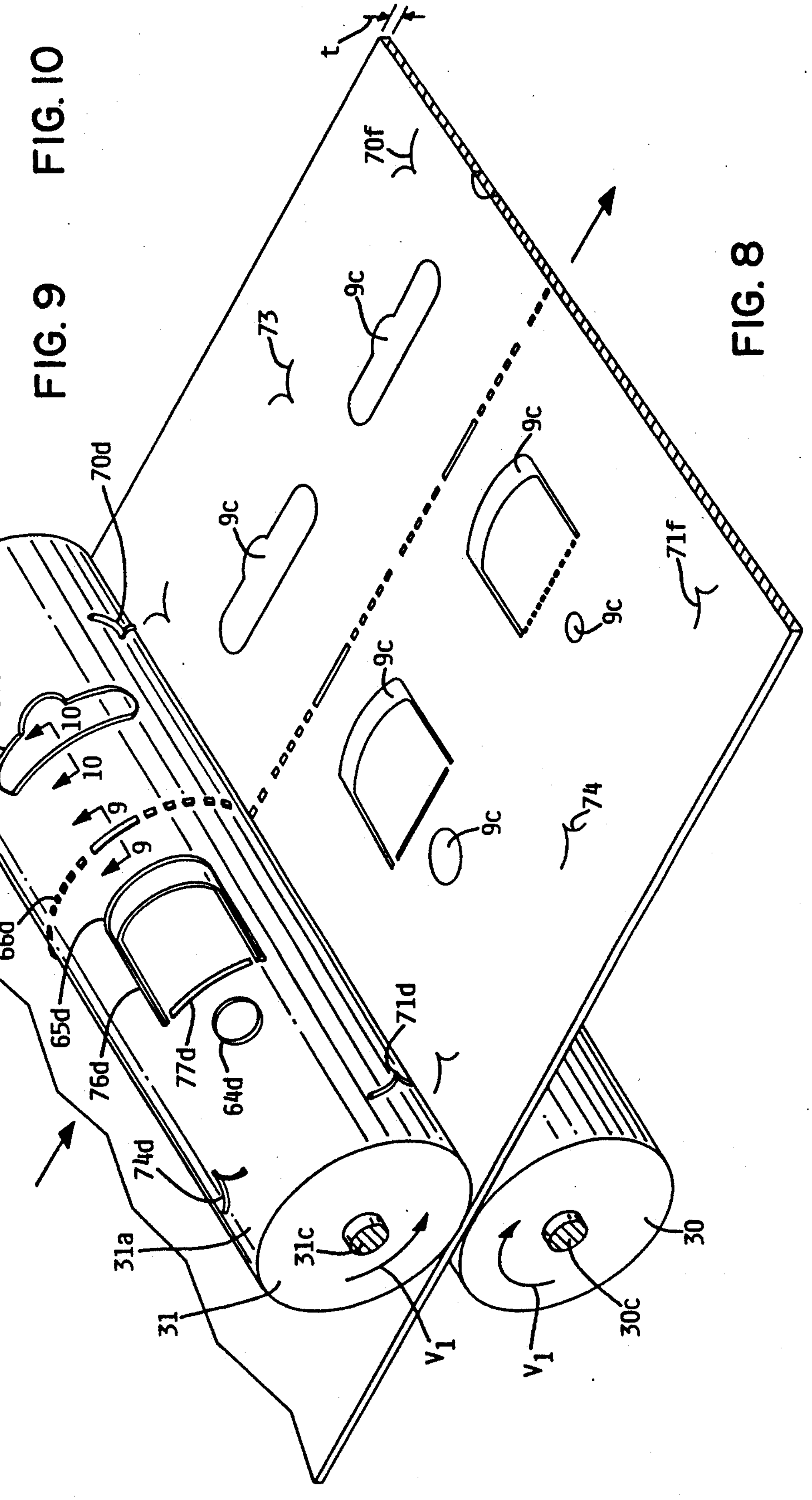
FIG. 8 is a perspective view of the first die cutting rollers for making internal cuts.

In order to illustrate the two-step process of cutting the web, reference should be made to FIG. 8 which shows the first cutting station which comprises interior die cutting roller 31 and back-up roller 30. In operation of the flexographic press back-up roller 30 and die cutting roller 31 are moving at the same surface velocity $V_1$ as web 9 is fed through he first cutting station.

Figure 10:
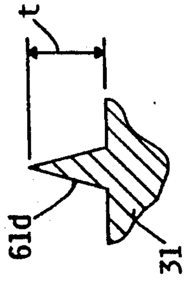
FIG. 10 is a cross sectional view taken along line 10—10 to show a cutting tooth.

In order to illustrate the various types of interior cuts made at the first cutting station on web 9 there is located on surface 31*a* die cutting members 63*d*, 65*d*, 61*d*, 73*d*, 70*d* and 74*d*. The numerals of the die cutting members are referenced to the cuts in the dial card 60. Die cutting members 63*d*, 65*d*, 61*d*, 73*d*, 70*d* and 74*d* contain sharp or tapered cutting edges (see FIG. 10), while the region 66*d* contains a rectangular type of tooth (see FIG. 9) for inserting into the die card to form a perforation line 66. Attention is called to die cuts 73 and 74 formed by die cutters 73*d* and 74*d*. These die cuts 73 and 74 in web stock 9 provide markings in the web 9 that allow an operator to subsequently align the second cutting operation with the first cutting operation.

Figures 11, 12, 13, 14:
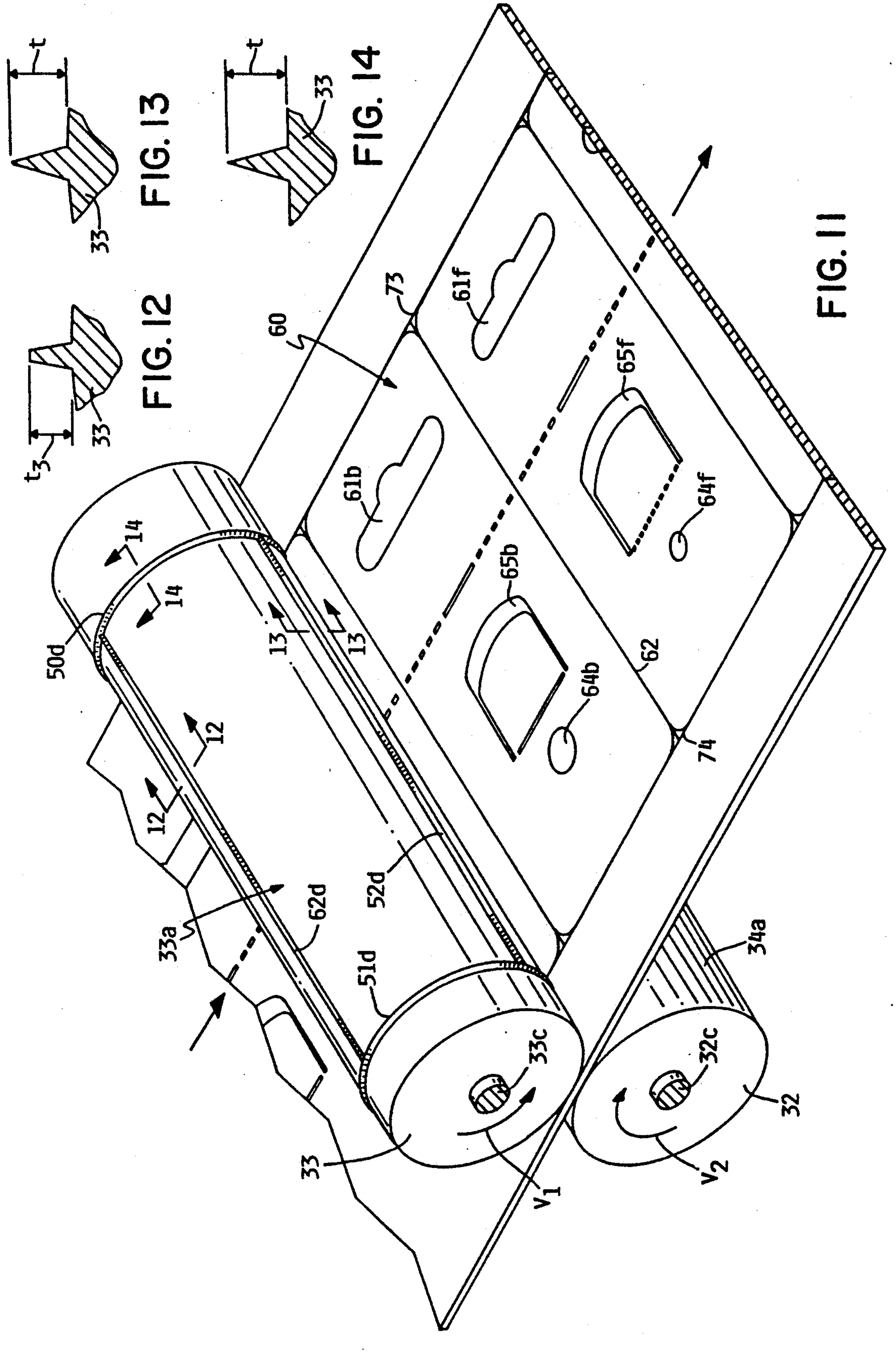
FIG. 11 is a perspective view of the second set of die cutting rollers for making external cuts on the dial card.
FIG. 12 is a cross sectional view taken along line 12—12 of FIG. 11 to a show cutting blade for making a fold line.
FIG. 13 is a cross sectional view taken along line 13—13 of FIG. 11 to show an outside cutting blade for cutting the exterior shape of the dial card.
FIG. 14 is a cross sectional view taken along line 13—13 of FIG. 11 to show a second outside cutting blade for cutting the exterior shape of the dial card.

The second die cutting operation is illustrated in FIG. 11. FIG. 11, shows a second die cutting station with a second set of die cutting rollers comprising an exterior die cutting roller 33 that rotates around axis 33*c* and a lower back up roller 32 that rotates around axis 32*c*. The surface velocity of die cutting roller 33 has the same surface velocity $V_1$ as rollers 30, 31 and 33; however, the bottom roller 32 has a slightly faster surface velocity $V_2$ so as to provide a pulling action to web 9 as it passes between cutting roller 33 and 32. It has been found that by using a slightly faster velocity on the second cutting operation one can prevent the heavier web used for dial cards and the like from jamming in the flexographic printing press. The exact reason why having a faster surface velocity on the backup roller prevents jamming is not fully understood but it has been found to prevent the web from jamming possibly by applying additional tension to web 9 to accommodate for any slipping that may occur in the die cutting process. In operation the surface velocity $V_2$ should be about 2% faster than $V_1$ for 20 pt (20 mil) solid board sulphate stock. The velocity $V_2$ will depend on the type and weight of paper used and can readily determined for each weight paper used by visually observing what surface velocity is required to prevent jamming of the web stock during the flexographic process.

Once the cut baking card 60 passes through the first die cutting station an air jet 36 blows cutouts 9*c* from the dial card. (see FIG. 1)

Next the web 9 enters the second web cutting station. The second web cutting station in includes an exterior die cutting roller 33 having exterior die cutter blades 51*d*, 50*d*, and 52*d* to cut the final openings around the outside of dial card 60. In addition die cutting roller 33 includes a blade 62*d* that forms the fold line between the two halves of the dial card. By visually observing whether the fold line 62 is aligning with the points on cuts 73 and 74 the operator can determine if the two cutting operations are in register. If they are not the cutting rollers in the second cutting station can be adjusted so that fold line 62 is in alignment with cut marks 73 and 74 thus assuring that all the other cuts and perforation lines will be in alignment so that the dial card can be folded with the two halves in register with each other.

Next, dial card 60 is stripped from web 9 by rollers 39 and 40. The waste web 9*b* is rolled into a roll for recycling and dial cards 9*d* are sent on for further processing.

While the process is described for use in making a dial card other products requiring use of stiffer web materials could also be made by the process.

I claim:

1. The flexographic press method of making a foldable dial card that can be folded on itself with the folded dial card having openings and edges in registration comprising the steps of:

feeding an elongated web of thickness t into a flexographic press with the thickness of the web sufficiently thick so as to normally cause the web to jam during the flexographic printing process;

printing a first color onto the web followed by drying the first color;

printing a second color on the web followed by drying the second color;

feeding the web between a first pair of rollers rotating at the same surface velocity to cut internal regions of a dial card in the web;

blowing on the web to remove internal cutouts from the web to thereby form a dial card from the web; and feeding the web with the cut internal regions between a second pair of rollers to cut exterior regions of the dial card with the second pair of rollers comprising a die cutting roller rotating at a first surface velocity and a back-up roller rotating at a second surface velocity, said second surface velocity slightly larger than the first surface velocity of the die cutting roller to thereby apply a shearing pull force to the web to prevent jamming of the web in the flexographic press.

2. The method of claim 1 wherein the die cutting roller has a cutting blade for making a fold line in the web where the cutter blade has a height that is approximately $\frac{3}{4}$ of the thickness of the web.

3. The method of claim 1 including forming a perforation line on the web where the perforation line is formed by punch-like teeth having a height of approximately one-half t.

4. The method of claim 1 including forming holes for registration with each other with one of the holes being larger than the other holes.

5. The method of claim 1 including an interior cutting roller for cutting interior cuts on the dial card being formed in said web.

6. The method of claim 1 wherein the die cutting roller includes blades that cut completely through the dial card.

7. The method of claim 1 wherein the web material fed into the press has a minimum thickness t of 19 mils.

8. The method of claim 2 wherein the web material fed into the press has a minimum thickness t of about 15 to 20 mils.

9. The method of claim 8 including forming a perforation line on the web where the perforation line is performed by punch-like teeth having a height of approximately one-half t.

10. The method of claim 1 wherein the second surface velocity of the backup roller is about 2% faster than the first surface velocity of the die cutting roller.

11. The method of printing and cutting a product from a stiff web material on a flexographic printing press comprising the steps of:

feeding an elongated stiff web material of thickness t into a flexographic press with the web material having sufficient thickness so that the web material normally jams in the flexographic press;

printing a first color onto the web followed by drying the first color;

feeding the web material between a first pair of rotary web cutting rollers to cut internal regions to form cut visible alignment markings in the web material;

feeding the web material with cut internal regions having the visible alignment markings between a second pair of rotary web cutting rollers to form a further cut in the web material; and using a portion of the cut visible alignment markings as an alignment guide for aligning the further cut in the web material to thereby ensure that the cut internal regions formed by the first pair of rotary web cutting rollers will be in alignment with the further cut formed by the second pair of rotary web cutting rollers.

* * * * *